United States Patent
Bolin

(10) Patent No.: US 9,821,698 B2
(45) Date of Patent: Nov. 21, 2017

(54) DUMP BODY FOR A WORKING MACHINE

(71) Applicant: VOLVO CONSTRUCTION EQUIPMENT AB, Eskilstuna (SE)

(72) Inventor: Lars Bolin, Ingelstad (SE)

(73) Assignee: Volvo Construction Equipment AB, Eskilstuna (SE)

( * ) Notice: Subject to any disclaimer, the term of this patent is extended or adjusted under 35 U.S.C. 154(b) by 7 days.

(21) Appl. No.: 14/784,433

(22) PCT Filed: May 7, 2013

(86) PCT No.: PCT/SE2013/000064
§ 371 (c)(1),
(2) Date: Oct. 14, 2015

(87) PCT Pub. No.: WO2014/182202
PCT Pub. Date: Nov. 13, 2014

(65) Prior Publication Data
US 2016/0075268 A1  Mar. 17, 2016

(51) Int. Cl.
*B60P 1/28* (2006.01)
*B65D 90/08* (2006.01)
(Continued)

(52) U.S. Cl.
CPC .............. *B60P 1/28* (2013.01); *B23K 31/02* (2013.01); *B60P 1/286* (2013.01); *B62D 65/02* (2013.01); *B65D 88/123* (2013.01); *B65D 90/08* (2013.01)

(58) Field of Classification Search
CPC .. B60P 1/286; B60P 1/28; B60P 3/423; B60P 1/283; B60P 1/16; B60P 1/26; B60P 1/165; B60P 3/42; B62D 33/02; B62D 47/003; B62D 33/037; B62D 23/005; B62D 25/2054; B62D 33/0273; B62D 33/08; B61D 5/002; B61D 17/10; B61D 3/16; B61D 9/12
(Continued)

(56) References Cited

U.S. PATENT DOCUMENTS 1,290,091 A   1/1919   Cole
1,842,735 A   1/1932   Neal
(Continued)

FOREIGN PATENT DOCUMENTS

CA   2086058 C   12/1996
CN   1238726 A   12/1999
(Continued)

OTHER PUBLICATIONS

International Search Report (Jan. 24, 2014) for corresponding International App. PCT/SE2013/000064.
(Continued)

*Primary Examiner* — Glenn Dayoan
*Assistant Examiner* — Sunsurraye Westbrook
(74) *Attorney, Agent, or Firm* — WRB-IP LLP

(57) ABSTRACT

A dump both for a working machine includes two main plates for creating a load receiving surface. The two main plates are joined to each other by a weld joint. The dump body includes a backing plate arranged on the two main plates at the inside of the dump body. The backing plate covers the weld joint and is joined to the two main plates by the weld joint.

15 Claims, 3 Drawing Sheets

(51) Int. Cl.
*B65D 88/12* (2006.01)
*B23K 31/02* (2006.01)
*B62D 65/02* (2006.01)

(58) Field of Classification Search
USPC ............ 296/183.2, 183.1, 184.1, 36, 41, 61, 296/65.16, 98, 100.07, 11, 164; 298/17 R, 1 R, 22 R, 7, 18, 1 B, 19 R, 298/23 D; 414/528, 809, 812, 393, 397, 414/421, 470
See application file for complete search history.

(56) References Cited

U.S. PATENT DOCUMENTS

| | | | |
|---|---|---|---|
| 3,841,236 A | 10/1974 | Hammonds et al. | |
| 4,079,676 A * | 3/1978 | Miller ................... | B61D 17/06 |
| | | | 105/406.1 |
| 4,331,083 A * | 5/1982 | Landregan ............. | B61D 9/06 |
| | | | 105/247 |
| 4,770,315 A * | 9/1988 | Supik ..................... | B01J 19/02 |
| | | | 220/678 |
| 4,993,619 A * | 2/1991 | Kresse, Jr. ........... | B23K 33/008 |
| | | | 228/135 |
| 6,241,144 B1 * | 6/2001 | Mandon ................ | B23K 33/00 |
| | | | 172/762 |
| 6,592,171 B1 | 7/2003 | Hinds | |
| 8,882,178 B2 * | 11/2014 | Kitaguchi .............. | B60P 1/286 |
| | | | 296/183.2 |
| 8,882,179 B2 * | 11/2014 | Kitaguchi ................ | B60P 1/28 |
| | | | 296/183.2 |
| 2014/0183904 A1 * | 7/2014 | Moon ..................... | B60P 1/286 |
| | | | 296/183.2 |

FOREIGN PATENT DOCUMENTS

| | | |
|---|---|---|
| DE | 1630604 A1 | 6/1971 |
| EP | 0049845 A1 | 4/1982 |
| FR | 803442 A1 | 9/1936 |

OTHER PUBLICATIONS

International Preliminary Report on Patentability (Jun. 1, 2015) for corresponding International App. PCT/SE2013/000064.
European Official Action (Dec. 8, 2016) for corresponding European App. EP13863869.
Chinese Official Action (Dec. 22, 2016) for corresponding Chinese App. 201380076376.4.

* cited by examiner

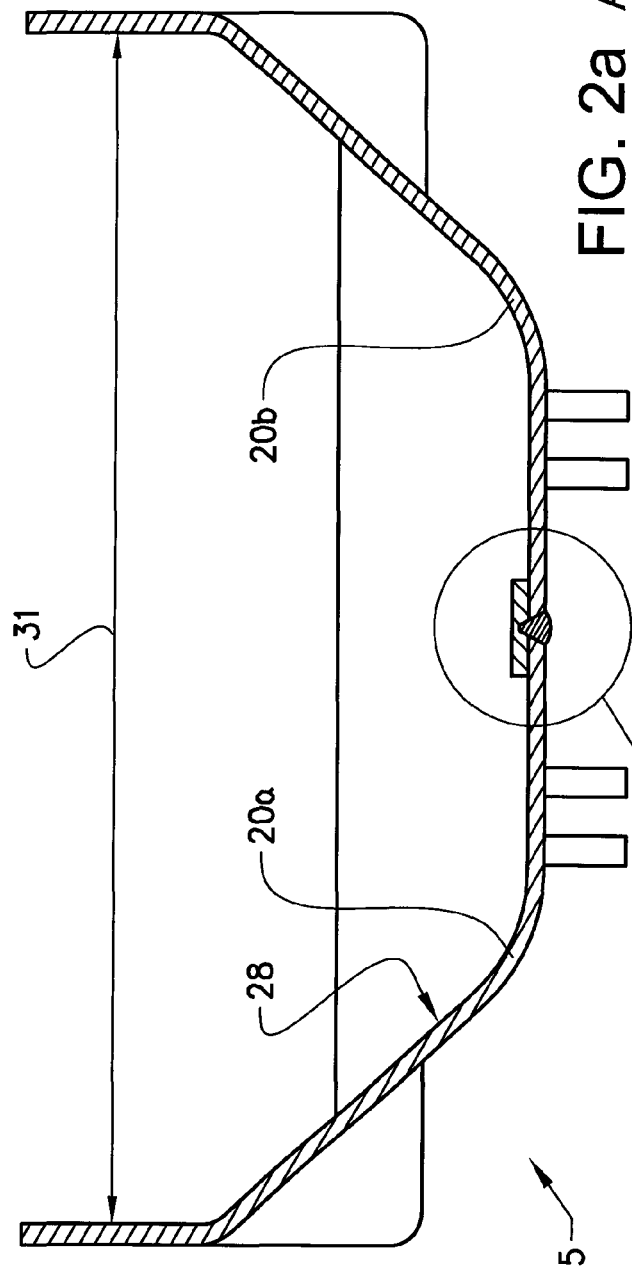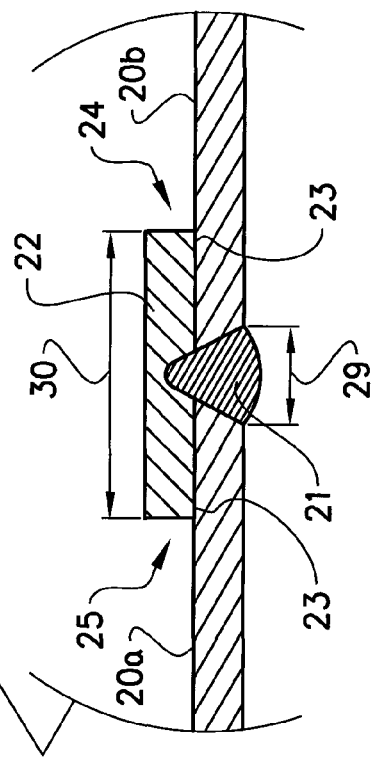

DUMP BODY FOR A WORKING MACHINE

BACKGROUND AND SUMMARY

The invention relates to a dump body for a working machine and a method for manufacturing such a dump body.

The invention is applicable on working machines within the fields of industrial construction machines, in particular articulated haulers. Although the invention will be described hereinafter with respect to an articulated hauler, the invention is not restricted to this particular machine, but may also be used in other load receiving working machines or construction equipment.

An articulated hauler is provided with a dump body or container for carrying and transporting a load. An articulated hauler may be operated with large and heavy loads, for example for transports in connection with road or tunnel building, sand pits, mines and similar environments.

The dump body is usually made of several flat plates that are welded together to obtain the requisite strength. Usually the dump body is weaker at the welded areas where cracks start and therefore a lot of reinforcement plates are used to build up the body. This will result in a heavy design of the dump both and also a time consuming manufacturing process.

It is desirable to provide a dump body defined by way of introduction, which dump body enables a reduced weight and/or a less time consuming manufacturing process of the dump body.

By the provision of a backing plate load can be absorbed by the backing plate, while the backing plate being bent and the load on the two main plates in the area close to the weld joint can be reduced. Since the backing plate results in a stress distribution in the main plates that is low at the weld joint and is increasing with the distance from the weld joint, the weld joint can be arranged in the middle of the dump body where the load normally would be too high to a weld joint. This in turn enables that the major part of the load receiving surface can be created solely by the two main plates or at least by very few plates which also means that the weight of the dump body may be reduced.

In addition, the backing plate will protect the weld joint from being hit or worn by load, such as stones, etc., brought into the dump body.

By the provision of a method comprising the step of arranging a backing plate on said two main plates at the inside of the dump body as a backing bar during the joining of said two main plates by the weld joint, and at the same time joining the backing plate to the two main plates by means of the weld joint, the manufacturing process is facilitated at the same time as the dump body may be produced to have reduced weight.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 2a shows a cross section view of one embodiment of the dump body according to the invention, FIG. 2b is an enlarged view of the dump body in FIG. 2a illustrating the backing plate and the weld joint.

DETAILED DESCRIPTION

Figure 1:
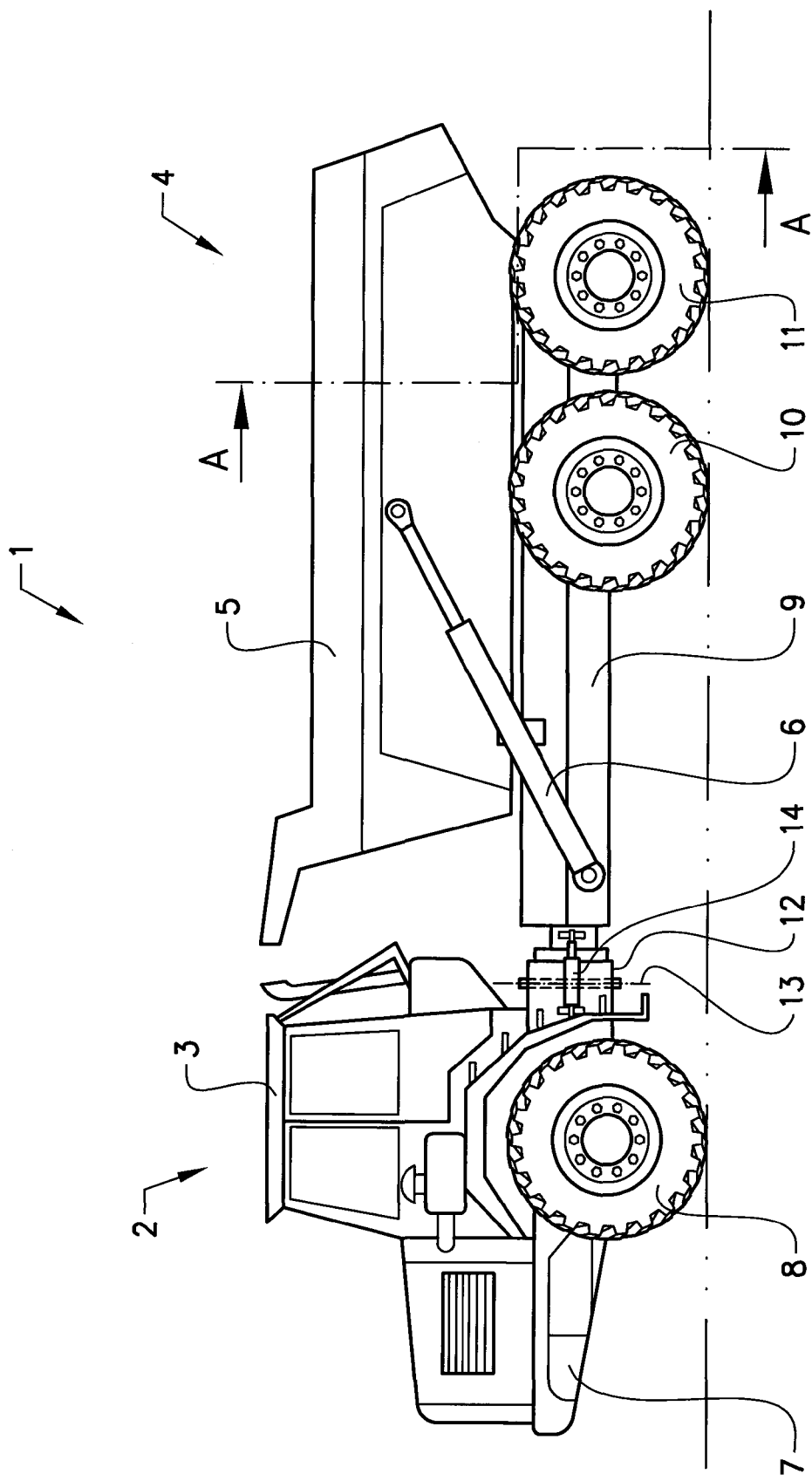
FIG. 1 is a lateral view illustrating an articulated hauler having a dump body for receiving and transporting load.

FIG. 1 is an illustration of a working machine 1 in the form of an articulated hauler having a front section 2 with a cab 3 for an operator and a rear section 4 with a dump body or container 5 for receiving, transporting and tipping a load. The front section has a front frame 7 and a pair of wheels 8 suspended from the front frame 7. The rear section 4 has a rear frame 9 and two pair of wheels 10, 11 suspended from the rear frame 9.

For the tipping function the dump body 5 is preferably pivotally connected to the rear frame 9 of the rear section 4 and is tiltable by a tilting means, such as a pair of hydraulic cylinders 6.

The articulated hauler is frame-steered, i.e. there is a pivot joint 12 connecting the front section 2 and the rear section 4 of the articulated hauler 1 such that the front section and the rear section are pivotally connected to each other for pivoting about a substantially vertical axis 13. The articulated hauler preferably comprises a hydraulic system having two hydraulic cylinders 14, steering cylinders, arranged on opposite sides of the articulated hauler for turning the hauler by means of relative movement of the front section and the rear section.

In addition, the connection between the front section and rear section can be designed to allow the front and rear section to pivot relative each other about a horizontal pivot axis extending in the longitudinal direction of the articulated hauler.

FIG. 2a is a cross section view of the dump body in FIG. 1 and FIG. 2b is an enlarged illustration of a central bottom portion of the dump body illustrated in FIG. 2a. As can be seen in FIGS. 2a and 2b, the dump body has two main plates 20a, 20b for creating a load receiving surface 28. The two main plates 20a, 20b are joined to each other by a weld joint 21, which preferably is a butt joint. The dump body 5 comprises a backing plate 22 arranged on said two main plates at the inside of the dump body 5. The backing plate 22 covers the weld joint 21 and is joined to the two main plates 20a, 20b by means of the well joint 21. The backing plate extends in the longitudinal extension direction 27 of the dump body 5. See also FIG. 3. The length of the backing plate is preferably substantially the same as the length of the weld joint, and the backing plate 22 can extend along substantially the entire length of the bottom of the dump body 5.

Preferably the backing plate 22 and said two main plates are arranged relative to each other such that the backing plate 22 constitutes a backing bar for said two main plates 20a, 20b during welding; i.e. a fixed backing, bar since the backing plate 22 is not removed after welding. This gives a support during welding of the main plates 20a, 20b at the same time as the backing plate 22 is joined to the main plates.

The two main plates 20a, 20b are preferably bent to form a rounded load receiving surface 28 as illustrated in FIG. 2a. The backing plate 22 is however preferably substantially flat or at least less rounded than the main plates, i.e. having a greater radius than the bent radius of the main plates.

Therefore, in the area close to the welding joint the main plates 20a, 20b are less rounded or flat to avoid or minimize a gap between the backing plate and the main plates 20a, 20b during welding.

In a loaded condition, the main contact zones 23 between the backing plate 22 and the main plates 20a, 20b (with the exception for the weld joint position where they are joined) will be located along the both free ends or edges extending in the longitudinal direction of the backing plate, and thereby the stress caused by the load carried by the dump body can be effectively reduced in the weld joint as well as in the area close to the weld joint.

Figure 3:
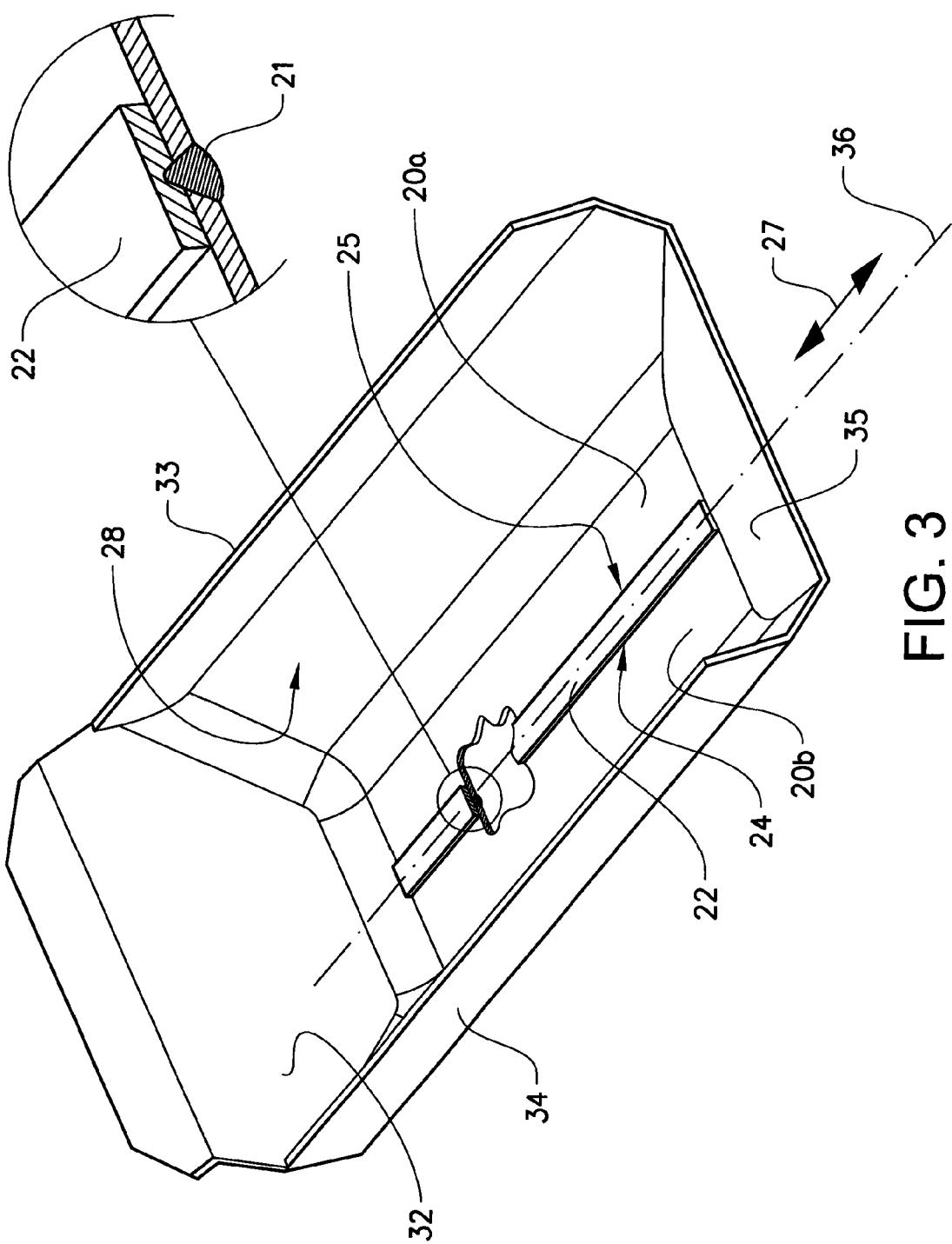
FIG. 3 shows the dump body in FIG. 2a in a perspective view.

The free ends or longitudinal edges 24, 25 of the backing plate, where the main contact zones 23 between the backing plate 22 and the main plates 20a, 20b are located in the loaded condition, are illustrated in FIG. 3.

See also FIG. 3, where the weld joint 21 is preferably arranged at or in close vicinity to the lowest pan of the load receiving surface 28 of the dump body 5. The thickness of the main plates as well as the backing plate can preferably be in the range 4-12 mm. For example quenched and hardened steel plates having tensile strength above 1000 MPa can be used to minimize buckling and abrasion of the dump body.

The width 30 of the backing plate 22 in a direction perpendicular to the longitudinal 5 extension direction 27 of the weld joint 21 is preferably relatively small as compared to the width 31 of the load receiving surface 28 created by means of the main plates 20a, 20b in the same direction. The width 30 of the backing plate 22 in a direction perpendicular to the longitudinal extension direction 27 of the weld joint 21 is preferably less 0.2 times the width, and more preferably less than 0.1 times the width 31 of the load receiving surface 10 28 of the dump body 5 in said direction.

On the other hand the backing plate 22 has to cover the weld joint 21 and contribute to the desired stress distribution, and preferably the width 30 of the backing plate 22 in a direction perpendicular to the longitudinal extension direction 27 of the weld joint 21 15 exceeds 0.01 times the width, and more preferably the width exceeds 0.05 times the width 31 of the load receiving surface 28 of the dump body 5 in said direction.

The width 30 and thickness of the hacking plate 22 are suitably adapted to the width 31 and/or shape of the main plates 20a, 20h to obtain the desired stress distribution in the 20 weld joint 21 and in the main plates in the area close to the weld joint 21 when the dump body 5 is loaded.

The width 30 of the backing plate 22 in a direction perpendicular to the longitudinal extension direction 27 of the weld joint 21 is preferably in the range 2-50, and more 5 preferably 10-30 times the width 29 of the weld joint 21.

The width of the backing plate is preferably in the range 10-30 times the thickness of the backing plate.

FIG. 3 shows the dump body 5 in a perspective view illustrating the inside of the dump body. In addition to the main plates 20a, 20b and the backing plate 22, the dump body preferably has a front end wall 32, and can also have upper longitudinal side walls 33, 34. In the rear end of the dump body 5 there is a rear end wall or rather a chute portion 35 enabling the load to be dumped.

The perspective view in FIG. 3 is partly cut to show the weld joint 21 under the backing plate 22. The longitudinal extension direction 27 of the weld joint 21 is substantially in parallel with the longitudinal extension direction of the dump body 5 and the working machine. The length of the weld joint 21 is preferably the same as the corresponding length of the edges of the main plates 20a, 20b that are welded together.

In the embodiment illustrated in FIG. 3, the longitudinal extension direction 27 of the weld joint 21 is in parallel with and preferably extends substantially along a longitudinal centre line 36 of the dump body 5.

The aggregated surface of the two main plates 20a, 20b at the inside of the dump body, or in other words; the both inner surfaces of the main plates together, preferably constitutes at least 50%, and more preferably at least 70% of the total load receiving surface 28 of the dump body 5. The dump body 5 could be designed in a way where the aggregated surface of the two main plates 20a, 20b constitutes substantially the major part or entire load receiving surface 28 of the dump body 5 with the exception of any end walls 32, 35 arranged at the intended front portion and/or rear portion of the dump body 5.

The invention also relates to a method for manufacturing a dump body 5 for a working machine, the method comprises the step of arranging the backing plate 22 on said two main plates 20a, 20b at the inside of the dump body as a hacking bar during the welding of said two main plates. The main plates are preferably joined to each other by a butt joint 21 by welding from the outside of the dump body 5. At the same time the backing plate 22 is joined to the two main plates 20a, 20b by means of the weld joint 21. Preferably, the welding material has good elongation values and very good impact strength.

It is to be understood that the present invention is not limited to the embodiments described above and illustrated in the drawings; rather, the skilled person will recognize that many changes and modifications may be made within the scope of the appended claims.

The invention claimed is:

1. A dump body for a working machine, the dump body being adapted to assume a loaded condition in which one or more objects are loaded onto an interior load receiving surface of the dump body, the dump body comprising two main plates that form the interior load receiving surface of the dump body, the two main plates being joined to each other by a weld joint, wherein the dump body comprises a backing plate arranged on the two main plates at the inside of the dump body, the backing plate covering the weld joint and being joined to the two main plates by the weld joint, wherein the backing plate comprises free longitudinal edges, wherein a width of the backing plate in a direction perpendicular to the longitudinal extension direction of the weld joint is less than 0.2 times a width of the load receiving surface of the dump body in the direction perpendicular to the longitudinal extension direction of the weld joint.

2. A dump body according to claim 1, wherein the longitudinal extension direction of the weld joint is substantially in parallel with a longitudinal extension direction of the dump body.

3. A dump body according to claim 2, wherein the weld joint extends substantially along a longitudinal center line of the dump body.

4. A dump body according to claim 1, wherein the weld joint is arranged at or in close vicinity to a lowest part of the load receiving surface of the dump body.

5. A dump body according to claim 1, wherein the two main plates are bent to form a rounded load receiving surface.

6. A dump body according to claim 1, wherein a width of the backing plate in a direction perpendicular to the longitudinal extension direction of the weld joint is in the range of 2-50 times a width of the weld joint.

7. A dump body according to claim 1, wherein an aggregated surface of the two main plates at the inside of the dump body constitutes at least 50% of a total load receiving surface of the dump body.

8. A dump body according to claim 1, wherein an aggregated surface of the two main plates constitutes substantially an entire load receiving surface of the dump body with an exception of one or more end walls arranged at at least one of an intended front portion an intended rear portion of the dump body.

9. A dump body according to claim 1, wherein the weld joint is a butt joint.

10. A dump body according to claim 1, wherein the backing plate and the two main plates are arranged relative to each other such that the backing plate constitutes a fixed backing bar for the two main plates.

11. A working machine comprising a dump body according to claim 1.

12. A dump body according to claim 1, wherein the two main plates define at least part of bottom surface of the interior load receiving surface.

13. A dump body according to claim 12, wherein the weld joint runs along a longitudinal center line of the load receiving surface.

14. A dump body for a working machine, the dump body being adapted to assume a loaded condition in which one or more objects are loaded onto an interior load receiving surface of the dump body, the dump body comprising two main plates that form the interior load receiving surface of the dump body, the two main plates being joined to each other by a weld joint, wherein the dump body comprises a backing plate arranged on the two main plates at the inside of the dump body, the backing plate covering the weld joint and being joined to the two main plates by the weld joint, wherein the backing plate comprises free longitudinal edges, wherein a width of the backing plate in a direction perpendicular to the longitudinal extension direction of the weld joint exceeds 0.01 times the width of the load receiving surface of the dump body in the direction perpendicular to the longitudinal extension direction of the weld joint.

15. A dump body for a working machine, the dump body being adapted to assume a loaded condition in which one or more objects are loaded onto an interior load receiving surface of the dump body, the dump body comprising two main plates that form the interior load receiving surface of the dump body, the two main plates being joined to each other by a weld joint, wherein the dump body comprises a backing plate arranged on the two main plates at the inside of the dump body, the backing plate covering the weld joint and being joined to the two main plates by the weld joint, wherein the backing plate comprises free longitudinal edges, wherein a width of the backing plate is in the range 10-30 times a thickness thereof.

* * * * *